(12) United States Patent
Xu et al.

(10) Patent No.: US 10,403,217 B2
(45) Date of Patent: Sep. 3, 2019

(54) DISPLAY PANEL AND LIQUID THE DRIVING METHOD THEREOF

(71) Applicant: Shenzhen China Star Optoelectronics Technology Co., Ltd., Shenzhen, Guangdong (CN)

(72) Inventors: Jing Xu, Guangdong (CN); Tai-jiun Hwang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 327 days.

(21) Appl. No.: 14/768,694

(22) PCT Filed: Jul. 10, 2015

(86) PCT No.: PCT/CN2015/083740
§ 371 (c)(1),
(2) Date: Aug. 18, 2015

(87) PCT Pub. No.: WO2017/000321
PCT Pub. Date: Jan. 5, 2017

(65) Prior Publication Data
US 2017/0140716 A1    May 18, 2017

(30) Foreign Application Priority Data
Jul. 1, 2015  (CN) .......................... 2015 1 0377672

(51) Int. Cl.
*G09G 3/3258*    (2016.01)
*G09G 3/36*    (2006.01)
(Continued)

(52) U.S. Cl.
CPC ......... *G09G 3/3607* (2013.01); *G02F 1/1368* (2013.01); *G02F 1/13624* (2013.01);
(Continued)

(58) Field of Classification Search
CPC ... G09G 3/2011; G09G 3/3233; G09G 3/3406
(Continued)

(56) References Cited

U.S. PATENT DOCUMENTS 7,808,465 B2    10/2010  Hsueh
7,898,513 B2    3/2011   Kong
(Continued)

FOREIGN PATENT DOCUMENTS

CN    101349820A A    1/2009
CN    102087826A A    6/2011
CN    103854616A A    6/2014

*Primary Examiner* — Abdul-Samad A Adediran
(74) *Attorney, Agent, or Firm* — Andrew C. Cheng

(57) ABSTRACT

The present invention discloses a display panel and the driving method thereof. It divides the pixel electrodes of the display panel into multiple groups according to the light color allowed passing through. That is, each said pixel electrode allows the light with the same color to pass through; during one frame display, the data driver applies independent Gamma voltage to each said pixel electrode. After the gate driver drives the gate line connected with a group of the pixel electrodes, it drives the gate line connected with next group of the pixel electrodes in sequence, so that it can independently adjust the Gamma voltage applied to the pixels with different colors.

14 Claims, 2 Drawing Sheets

(51) Int. Cl.
  *G09G 3/34* (2006.01)
  *G02F 1/1362* (2006.01)
  *G02F 1/1368* (2006.01)
  *G09G 3/3233* (2016.01)

(52) U.S. Cl.
  CPC ..... *G02F 1/136286* (2013.01); *G09G 3/3233* (2013.01); *G09G 3/3406* (2013.01); *G09G 3/3677* (2013.01); *G09G 3/3688* (2013.01); *G02F 2201/123* (2013.01); *G02F 2201/52* (2013.01); *G09G 2300/0452* (2013.01); *G09G 2300/0809* (2013.01); *G09G 2300/0842* (2013.01); *G09G 2310/0235* (2013.01); *G09G 2310/08* (2013.01); *G09G 2320/0673* (2013.01)

(58) Field of Classification Search
  USPC .......................................... 345/99, 102; 1/1
  See application file for complete search history.

(56) References Cited

U.S. PATENT DOCUMENTS

| | | | |
|---|---|---|---|
| 7,920,116 | B2 | 4/2011 | Woo et al. |
| 8,159,446 | B2 | 4/2012 | Lee et al. |
| 8,963,965 | B2 | 2/2015 | Jun et al. |
| 2002/0163490 | A1 | 11/2002 | Nose |
| 2004/0125422 | A1 | 7/2004 | Wang et al. |
| 2005/0041006 | A1* | 2/2005 | Lee ............... G09G 3/2011 345/99 |
| 2007/0146299 | A1* | 6/2007 | Kim ............... G09G 3/3406 345/102 |
| 2010/0164856 | A1 | 6/2010 | Liao et al. |
| 2013/0265340 | A1 | 10/2013 | Ahn |
| 2016/0372043 | A1* | 12/2016 | Yamanaka ........ G09G 3/3233 |

* cited by examiner

DISPLAY PANEL AND LIQUID THE DRIVING METHOD THEREOF

BACKGROUND OF THE INVENTION

1. Field of the Invention

The present invention relates to the field of displaying techniques, specifically to the field of the driving techniques of the display panel, and in particular to a display panel and the driving method thereof.

2. The Related Arts

Currently, the display principle of the display panel is as follows. The gate driver sequentially drives each gate lines to sequentially turn on each pixel electrode connected to the thin film transistor (TFT) of the gate lines. The data driver drives the data lines to apply the gray scale voltage to the pixel electrode connected to the data line. The display panel controls the liquid crystal reorientation according to the received gray scale voltage, which allows the light with different colors to pass through and displays the images. Because the wavelengths of the light with different colors are different leading to the different transmittance thereof in the display panel, it is necessary to adjust the Gamma curve (that is gray scale voltage-transmittance curve) corresponding to each color light, which ensures the white tracking of the displaying images.

The widespread method is to utilize the timing control IC (TCON) to apply the Gamma voltage to the pixel electrode corresponding to the light with different color, which adjusts the Gamma curve corresponding to the light with different colors. For example, according to a display panel with each pixel area comprising a red pixel electrode, a green pixel electrode, and a blue pixel electrode, in combination with the timing diagram of the gate driver sequentially driving the gate line as shown in FIG. 1, it can be known that after the data driver applies the Gamma voltage to the three pixel electrodes of a pixel area through a data line, it can apply the Gamma voltage to the three pixel electrodes of the next pixel area through the next data line. It can be seen that the existing technology cannot independently apply the Gamma voltage to all pixel electrodes with the same color, which cannot independently adjust the Gamma voltage applied to the pixel electrodes with different colors. Therefore, it cannot well adjust the Gamma curve corresponding to the light with different colors. The display quality of the display panel is not very satisfactory.

SUMMARY OF THE INVENTION

In view of this, the embodiment of the present invention provides a display panel and the driving method thereof, which can independently adjust the Gamma voltage applied to the pixels with different colors.

An embodiment of the present invention provides a display panel, comprising a timing controller, three pixel electrodes respectively allowing red, green, and blue light to pass through, a gate driver used for driving a gate line, and a data driver used for driving a data line;
wherein, each said pixel electrode allows the light with the same color to pass through, and each pixel area of the display panel comprises the pixel electrode allowing red light to pass through, the pixel electrode allowing green light to pass through, and the pixel electrode allowing blue light to pass through; each said pixel area is correspondingly connected with one said gate line and one said data line; the timing controller controls the data driver to apply a Gamma voltage through an inter-integrated circuit (I2C) or a serial peripheral interface (SPI); during one frame display, the data driver applies independent Gamma voltage to each said pixel electrode under the control of the timing controller; the gate driver drives the gate line connected with a group of the pixel electrodes and then drives the gate line connected with next group of the pixel electrodes in sequence under the control of the timing controller.

Wherein, the display panel further comprises three thin-film transistors (TFT) located at each said pixel area; the gate of the TFT is correspondingly connected with the gate line; the drain of the TFT is correspondingly connected with the pixel electrode; the sources of the three TFTs are selectively connected with the data line; when one source of the three TFT is connected with the data line, the other two sources are disconnected from the data line.

Wherein, the display panel further comprises a transistor provided between each said TFT and the data line; the transistor is selectively turned on under the control of an enable signal applied to the pixel area, so that the pixel electrode connected with the source of the TFT is connected to the corresponding data line.

Another embodiment of the present invention provides a display panel, comprising a timing controller, multiple pixel electrodes, a gate driver used for driving a gate line, and a data driver used for driving a data line; wherein, each said pixel electrode allows the light with the same color to pass through; during one frame display, the data driver applies independent Gamma voltage to each said pixel electrode under the control of the timing controller; the gate driver drives the gate line connected with a group of the pixel electrodes and then drives the gate line connected with next group of the pixel electrodes in sequence under the control of the timing controller.

Wherein, the display panel comprises three pixel electrodes respectively allowing red, green, and blue light to pass through, and each pixel area of the display panel comprises the pixel electrode allowing red light to pass through, the pixel electrode allowing green light to pass through, and the pixel electrode allowing blue light to pass through; each said pixel area is correspondingly connected with one said gate line and one said data line.

Wherein, the display panel further comprises three thin-film transistors (TFT) located at each said pixel area; the gate of the TFT is correspondingly connected with the gate line; the drain of the TFT is correspondingly connected with the pixel electrode; the sources of the three TFTs are selectively connected with the data line; when one source of the three TFT is connected with the data line, the other two sources are disconnected from the data line.

Wherein, the display panel further comprises a transistor provided between each said TFT and the data line; the transistor is selectively turned on under the control of an enable signal applied to the pixel area, so that the pixel electrode connected with the source of the TFT is connected to the corresponding data line.

Wherein, the timing controller controls the data driver to apply a Gamma voltage through an inter-integrated circuit (I2C) or a serial peripheral interface (SPI).

Another embodiment of the present invention provides a driving method of display panel, wherein, the display panel comprises a timing controller, multiple pixel electrodes, a gate driver used for driving a gate line, and a data driver used for driving a data line; wherein, the driving method comprises:
dividing the multiple pixel electrodes into multiple groups, the pixel electrode of each groups allowing the light with the same color to pass through;

during one frame display, the data driver applying independent Gamma voltage to each said pixel electrode under the control of the timing controller;

the gate driver driving the gate line connected with a group of the pixel electrodes and then driving the gate line connected with next group of the pixel electrodes in sequence under the control of the timing controller.

Wherein, it divides the multiple pixel electrodes into three groups which respectively allows red, green, and blue light to pass through, and each pixel area of the display panel comprises the pixel electrode allowing red light to pass through, the pixel electrode allowing green light to pass through, and the pixel electrode allowing blue light to pass through; each said pixel area is correspondingly connected with one said gate line and one said data line.

Wherein, the display panel further comprises three thin-film transistors (TFT) located at each said pixel area; the gate of the TFT is correspondingly connected with the gate line; the drain of the TFT is correspondingly connected with the pixel electrode; the sources of the three TFTs are selectively connected with the data line; when one source of the three TFT is connected with the data line, the other two sources are disconnected from the data line.

Wherein, a transistor is provided between each said TFT and the data line; the transistor is selectively turned on under the control of an enable signal applied to the pixel area, so that the pixel electrode connected with the source of the TFT is connected to the corresponding data line.

Wherein, the timing controller controls the data driver to apply a Gamma voltage through an inter-integrated circuit (I2C) or a serial peripheral interface (SPI).

The display panel and the driving method thereof according to the present invention divides the pixel electrodes of the display panel into multiple groups according to the light color allowed passing through. That is, each said pixel electrode allows the light with the same color to pass through; during one frame display, the data driver applies independent Gamma voltage to each said pixel electrode. After the gate driver drives the gate line connected with a group of the pixel electrodes, it drives the gate line connected with next group of the pixel electrodes in sequence, so that it can independently adjust the Gamma voltage applied to the pixels with different colors.

DETAILED DESCRIPTION OF THE PREFERRED EMBODIMENTS

The detailed descriptions accompanying drawings and the embodiment of the present invention are as follows.

Figure 2:
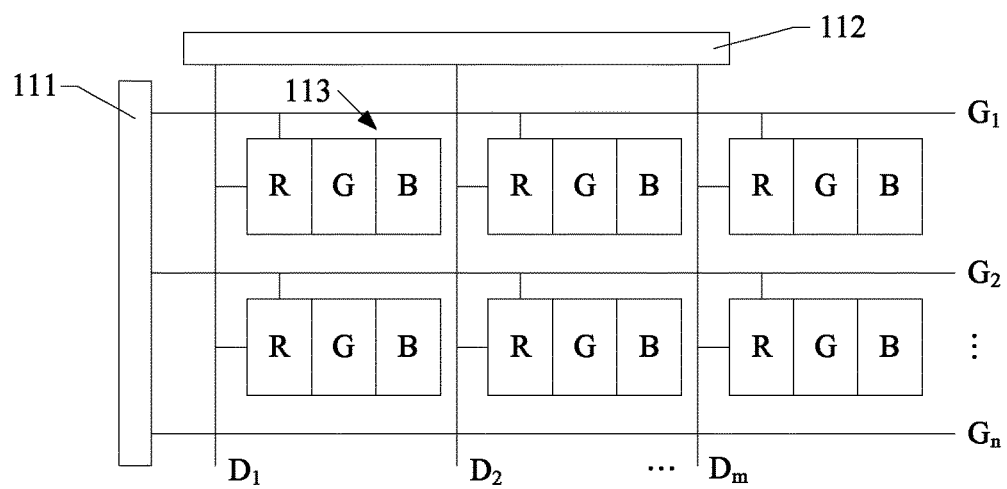
FIG. 2 is a schematic view illustrating the pixel structure of the display panel according to an embodiment of the present invention.

FIG. 2 is a schematic view illustrating the pixel structure of the display panel according to an embodiment of the present invention. as shown in FIG. 2, a display panel 10 comprises a gate driver 11, a data driver 12, multiple gate lines $G_1$, $G_2$, $G_n$ arranged at intervals, and data lines $D_1$, $D_2$, $D_m$ intersecting the gate lines in isolation. Wherein, m and n are both positive integer, the multiple gate lines $G_1$, $G_2$, $G_n$ and the multiple data lines $D_1$, $D_2$, $D_m$ define multiple pixel areas 13 arranged in an array in the display panel 10.

Each pixel area 13 comprises three pixel electrodes R, G, B respectively allowing red, green, and blue light to pass through. The three pixel electrodes R, G, B are connected with one gate line and one data line jointly, and only one of the three pixel electrodes R, G, B is connected with the corresponding data line on each connection. For example, when the pixel electrode R is connected with the data line $D_1$, the pixel electrodes G, B are disconnected from the data line $D_1$, wherein the "connection" is electrical connection.

Figure 3:
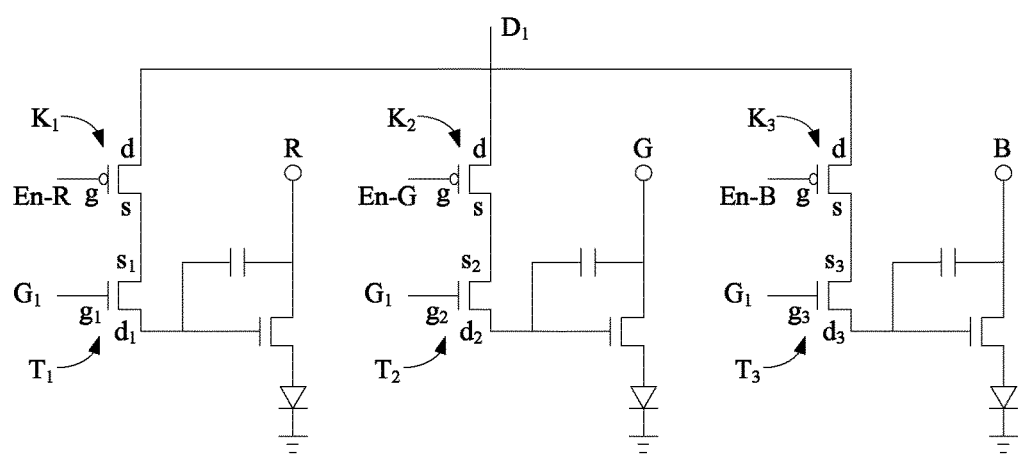
FIG. 3 is a schematic view illustrating the circuit structure of a pixel area shown in FIG. 2.

The present embodiment achieves the above connection and the disconnection through the circuit structure as shown in FIG. 3. In FIG. 3, there are thin film transistors ($T_1$, $T_2$, and $T_3$) provided between the three pixel electrodes R, G, B and the gate line $G_1$ in the pixel area 13. Wherein, the gate $g_1$ of the thin film transistor $T_1$ is connected with the gate line $G_1$, the drain $d_1$ of the thin film transistor $T_1$ is connected with the pixel electrode R, the gate $g_2$ of the transistor $T_2$ is connected with the gate line $G_1$, the drain $d_2$ of the thin film transistor $T_2$ is connected with the pixel electrode G, the gate $g_3$ of the transistor $T_3$ is connected with the gate line $G_3$, the drain $d_3$ of the thin film transistor $T_3$ is connected with the pixel electrode B, and the sources $s_1$, $s_2$, $s_3$ of the thin film transistors $T_1$, $T_2$, $T_3$ are selectively connected with the data line $D_1$. Specifically, there are transistors ($K_1$, $K_2$, and $K_3$) provided between the three pixel electrodes R, G, B and the data line $D_1$ in the pixel area 13. Each transistor is provided between the source of the thin film transistor and the data line $D_1$, which achieves the sources $s_1$, $s_2$, $s_3$ of the thin film transistors $T_1$, $T_2$, $T_3$ selectively connected with the data line $D_1$ through turning on and off the transistor. When one of the transistors $K_1$, $K_2$, and $K_3$ is turned on, the others are turned off.

Each transistor can be P-type MOSFET and achieve the above connection and the disconnection under the control of an enable signal. Specifically, the gate g of the transistor $K_1$ is used to receive the enable signal, the drain d of the transistor $K_1$ is connected with the data line $D_1$, the source s of the transistor $K_1$ is connected with the source $s_1$ of the thin film transistor $T_1$, the gate g of the transistor $K_2$ is used to receive the enable signal, the drain d of the transistor $K_2$ is connected with the data line $D_1$, the source s of the transistor $K_2$ is connected with the source $s_2$ of the thin film transistor $T_2$, the gate g of the transistor $K_3$ is used to receive the enable signal, the drain d of the transistor $K_3$ is connected with the data line $D_1$, and the source s of the transistor $K_3$ is connected with the source $s_3$ of the thin film transistor $T_3$.

The circuit shown in FIG. 3 is essentially a Demux circuit. The enable signal is essentially a Demux signal. The circuit can also comprise other components, such as capacitor. Each transistor can also be other type rather than the P-type MOSFET show in Figure.

Figure 4:
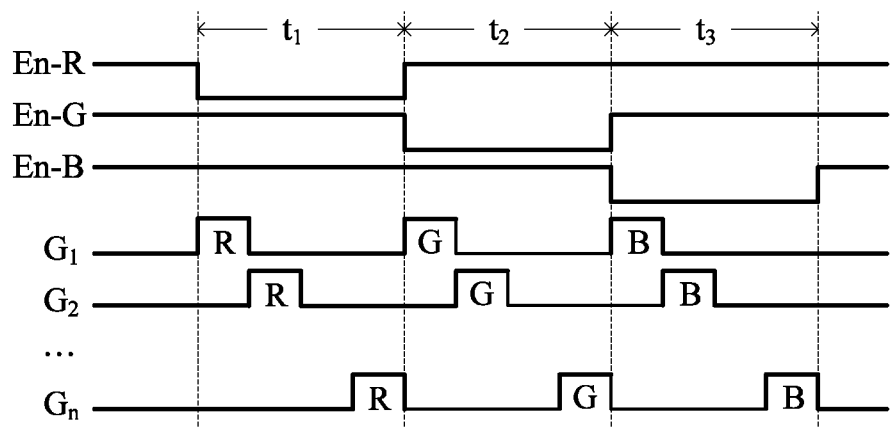
FIG. 4 is the timing diagram of each signal of the display panel according to the present invention.
Figure 5:
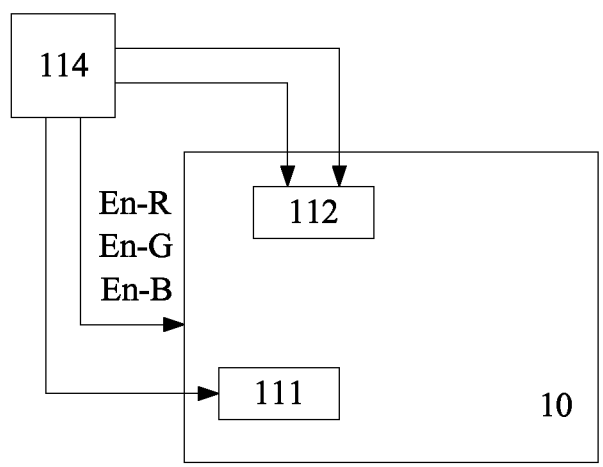
FIG. 5 is a schematic view illustrating the driving circuit of the display panel according to an embodiment of the present invention.

FIG. 4 is the timing diagram of each signal of the display panel according to the present invention. FIG. 5 is a schematic view illustrating the driving circuit of the display panel according to an embodiment of the present invention. In combination with FIG. 4 and FIG. 5, the timing controller 14, the data driver 12, and the gate driver 11 constitute the driver circuit of the display panel 10. Wherein, the timing controller 14 is used to control the output of each signal of the display panel 10, which is connected with the data driver 12 through low-voltage differential signaling (LVDS) interface or Mini-LVDS interface. Specifically, the timing controller 14 writes the Gamma code, which is supposed to apply to the Gamma voltage of the pixel electrodes R, G, B by the data driver 12, into electrically erasable programmable read-only memory (EEPROM) in advance. After the driver circuit is turned on, the timing controller 14 reads the Gamma code and then stores it in the random access memory (RAM) of the timing controller 14. When displaying, the timing controller 14 transfers the Gamma code of the corresponding color to the Gamma IC of the data driver 12 through an inter-integrated circuit (I2C) or a serial peripheral interface (SPI), which generates the Gamma voltage to be applied to each pixel electrode on the row direction. Wherein, the Gamma IC can be provided in the data driver 12 as part of the data driver 12, which can also be set separately.

Under the control of the timing controller 14, the gate driver 11 sequentially provides the gate driving signal to the gate lines to activate the thin film transistor corresponding to each gate line; the data driver 12 provides the Gamma voltage for the multiple data lines $D_1$, $D_2$, $D_m$, so that the Gamma voltage can be applied to the pixel electrodes R, G, B through the activated thin film transistor.

The timing controller 14 divides the time of each frame into three periods $t_1$, $t_2$, $t_3$. For example, the time of one frame is 1/60 second, then $t_1=t_2=t_3=(1/60)/3\approx5.5$ millisecond. That is, the cycle time of the timing controller 14 transferring data to the Gamma IC is 5.5 millisecond. During the first period $t_1$, it applies the Gamma voltage to the electrode R of all pixel areas 13; during the second period $t_2$, it applies the Gamma voltage to the electrode G of all pixel areas 13; during the third period $t_3$, it applies the Gamma voltage to the electrode B of all pixel areas 13. Specifically, in the first period $t_1$, the timing controller 14 outputs the low level enable signal En-R and the high level stop signals En-G, En-B, so that the transistor $K_1$ is turned on and the transistors $K_2$, $K_3$ is turned off, the gate driver 11 sequentially turns on the thin film transistor $T_1$ located in each pixel region 13 and charges the pixel electrode R, and then the data driver 12 applies the Gamma voltage to the pixel electrode R; in the second period $t_2$, the timing controller 14 outputs the low level enable signal En-G and the high level stop signals En-R, En-B, so that the transistor $K_2$ is turned on and the transistors $K_1$, $K_3$ is turned off, the gate driver 11 sequentially turns on the thin film transistor $T_2$ located in each pixel region 13 and charges the pixel electrode G, and then the data driver 12 applies the Gamma voltage to the pixel electrode G; in the third period $t_3$, the timing controller 14 outputs the low level enable signal En-B and the high level stop signals En-R, En-G, so that the transistor $K_3$ is turned on and the transistors $K_1$, $K_2$ is turned off, the gate driver 11 sequentially turns on the thin film transistor $T_3$ located in each pixel region 13 and charges the pixel electrode B, and then the data driver 12 applies the Gamma voltage to the pixel electrode B.

Whether the three transistors $K_1$, $K_2$, $K_3$ are turned on or off (that is, whether the enable signal or the stop signal is received), it depends on the type of each transistor and whether high or low level is received. For example, the three transistors $K_1$, $K_2$, $K_3$ shown in FIG. 3 are P-type MOSFET, and each transistor is turned off when applying high level and turned on when applying low level. If the three transistors $K_1$, $K_2$, $K_3$ are N-type MOSFET, then each transistor is turned off when applying low level and turned on when applying high level.

Figure 1:
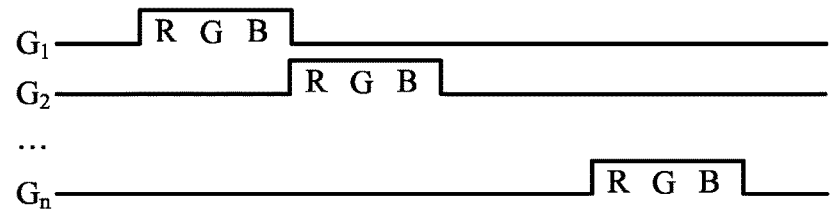
FIG. 1 is the timing diagram of the gate driver driving the gate line according to the existing technology.

Comparing to the timing according to the existing technology shown in FIG. 1, the driven time of each gate line in the present embodiment is one-third of the prior art, but the driven frequency is three times the prior art. In summary, because the present embodiment can apply the Gamma voltage to all pixel electrodes with the same color during the same period, it can independently adjust the Gamma voltage applied to the pixels with different colors, which increases the display quality of the display panel 10.

It should be understood that the colors of the pixel are not limited to red, green and blue. For example, transparent pixel (white) can be added in the display panel 10 to enhance the brightness of the display screen. At this time, the display panel 10 comprises four pixel electrodes.

In summary, the present invention is to divide the pixel electrodes of the display panel into multiple groups according to the colors of the passed light, that is, each said pixel electrode allows the light with the same color to pass through. During one frame display, the data driver applies independent Gamma voltage to each said pixel electrode. After the gate driver drives the gate line connected with a group of the pixel electrodes, it drives the gate line connected with next group of the pixel electrodes in sequence, so that it can independently adjust the Gamma voltage applied to the pixels with different colors.

Based on this, the above described embodiments of the invention only, and not limit, the patent scope of the present invention, therefore, the use of all the contents of the accompanying drawings and the description of the present invention is made to equivalent structures or equivalent conversion process, e.g., between the embodiments example technology mutually binding characteristics, directly or indirectly related to the use of technology in other fields, are included within the scope of patent empathy protection of the invention.

What is claimed is:

1. A display panel, wherein, the display panel comprises a timing controller, a first group of pixel electrodes allowing red light to pass through, a second group of pixel electrodes allowing green light to pass through, a third group of pixel electrodes allowing blue light to pass through, multiple pixel areas, gate drivers used for driving gate lines, and data drivers used for driving data lines;

wherein, each said pixel area of the display panel comprises a first pixel electrode allowing red light to pass through, a second pixel electrode allowing green light to pass through, and a third pixel electrode allowing blue light to pass through, the first group of pixel electrodes consists of multiple said first pixel electrodes, the second group of pixel electrodes consists of multiple said second pixel electrodes, and the third group of pixel electrodes consists of multiple said third pixel electrodes; each said pixel area is correspondingly connected with one said gate line and one said data line; the timing controller controls the data driver to apply a Gamma voltage through an inter-integrated circuit (I2C) or a serial peripheral interface (SPI);

wherein, the display panel further comprises a first TFT, a second TFT, and a third TFT located at each said pixel area, a drain of the first TFT is connected with the first pixel electrode, a drain of the second TFT is connected with the second pixel electrode, a drain of the third TFT is connected with the third pixel electrode, gates of the three TFTs are correspondingly connected with one said gate line, sources of the three TFTs are selectively and electrically connected with the data line; when a source of one of the three TFTs is electrically connected with the data line, sources of the other two of the three TFTs are electrically disconnected from the data line;

wherein, the display panel further comprises a first transistor provided between the first TFT and the data line, a second transistor provided between the second TFT and the data line, and a third transistor provided between the third TFT and the data line, the first transistor is turned on when a first enable signal is applied to each said pixel area, so that a source of the first TFT connected with the first pixel electrode is electrically connected to the data line, the second transistor is turned on when a second enable signal is applied to each said pixel area, so that a source of the second TFT connected with the second pixel electrode is electrically connected to the data line, the third transistor is turned on when a third enable signal is applied to each said pixel area, so that a source of the third TFT connected with the third pixel electrode is electrically connected to the data line; during one frame display, the data driver applies independent Gamma voltage to each said pixel electrode under the control of the timing controller; wherein the time controller divides time of the frame display into a first period, a second period, and a third period, and the time controller applies Gamma voltage to the first pixel electrodes of all of the pixel areas during the first period, applies Gamma voltage to the second pixel electrodes of all of the pixel areas during the second period, and applies Gamma voltage to the third pixel electrodes of all of the pixel areas during the third period; the gate driver drives gate lines connected with one of the first group of pixel electrodes, the second group of pixel electrodes, and the third group of pixel electrodes, and then drives gate lines connected with another of the first group of pixel electrodes, the second group of pixel electrodes, and the third group of pixel electrodes in sequence under the control of the timing controller.

2. The display panel according to claim 1, wherein, each pixel area includes Demux circuit, and the first, second, and third enable signals are Demux signals.

3. The display panel according to claim 1, wherein, compared with an existing display panel in which after a data driver applies Gamma voltage to three pixel electrodes of a pixel area through a data line, the data driver applies Gamma voltage to three pixel electrodes of a next pixel area through a next data line, the driven time of each gate line is one-third of the existing display panel, and the driven frequency is three times the existing display panel.

4. The display panel according to claim 1, further comprising a fourth group of pixel electrodes, wherein the fourth group of pixel electrodes are transparent pixel electrodes configured to enhance brightness.

5. A display panel, wherein, the display panel comprises a timing controller, a first group of pixel electrodes allowing red light to pass through, a second group of pixel electrodes allowing green light to pass through, a third group of pixel electrodes allowing blue light to pass through, multiple pixel areas, gate drivers used for driving gate lines, and data drivers used for driving data lines;

wherein, each said pixel area of the display panel comprises a first pixel electrode allowing red light to pass through, a second pixel electrode allowing green light to pass through, and a third pixel electrode allowing blue light to pass through, the first group of pixel electrodes consists of multiple said first pixel electrodes, the second group of pixel electrodes consists of multiple said second pixel electrodes, and the third group of pixel electrodes consists of multiple said third pixel electrodes; each said pixel area is correspondingly connected with one said gate line and one said data line;

wherein, the display panel further comprises a first TFT, a second TFT, and a third TFT located at each said pixel area, a drain of the first TFT is connected with the first pixel electrode, a drain of the second TFT is connected with the second pixel electrode, a drain of the third TFT is connected with the third pixel electrode, gates of the three TFTs are correspondingly connected with one said gate line, sources of the three TFTs are selectively and electrically connected with the data line; when a source of one of the three TFTs is electrically connected with the data line, sources of the other two of the three TFTs are electrically disconnected from the data line;

wherein, the display panel further comprises a first transistor provided between the first TFT and the data line, a second transistor provided between the second TFT and the data line, and a third transistor provided between the third TFT and the data line, the first transistor is turned on when a first enable signal is applied to each said pixel area, so that a source of the first TFT connected with the first pixel electrode is electrically connected to the data line, the second transistor is turned on when a second enable signal is applied to each said pixel area, so that a source of the second TFT connected with the second pixel electrode is electrically connected to the data line, the third transistor is turned on when a third enable signal is applied to each said pixel area, so that a source of the third TFT connected with the third pixel electrode is electrically connected to the data line; during one frame display, the data driver applies independent Gamma voltage to each said pixel electrode under the control of the timing controller; wherein the time controller divides time of the frame display into a first period, a second period, and a third period, and the time controller applies Gamma voltage to the first pixel electrodes of all of the pixel areas during the first period, applies Gamma voltage to the second pixel electrodes of all of the pixel areas during the second period, and applies Gamma voltage to the third pixel electrodes of all of the pixel areas during the third period; the gate driver drives gate lines connected with one of the first group of pixel electrodes, the second group of pixel electrodes, and the third group of pixel electrodes, and then drives gate lines connected with another of the first group of pixel electrodes, the second group of pixel electrodes, and the third group of pixel electrodes in sequence under the control of the timing controller.

6. The display panel as claimed in claim 5, wherein the timing controller controls the data driver to apply a Gamma voltage through an inter-integrated circuit (I2C) or a serial peripheral interface (SPI).

7. The display panel according to claim 5, wherein, each pixel area includes Demux circuit, and the first, second, and third enable signals are Demux signals.

8. The display panel according to claim 5, wherein, compared with an existing display panel in which after a data driver applies Gamma voltage to three pixel electrodes of a pixel area through a data line, the data driver applies Gamma voltage to three pixel electrodes of a next pixel area through a next data line, the driven time of each gate line is one-third of the existing display panel, and the driven frequency is three times the existing display panel.

9. The display panel according to claim 5, further comprising a fourth group of pixel electrodes, wherein the fourth group of pixel electrodes are transparent pixel electrodes configured to enhance brightness.

10. A driving method of display panel, wherein, the display panel comprises a timing controller, multiple pixel electrodes, multiple pixel areas, gate drivers used for driving gate lines, and data drivers used for driving data lines; wherein, the driving method comprises:

dividing the multiple pixel electrodes into a first group of pixel electrodes allowing red light to pass through, a second group of pixel electrodes allowing green light to pass through, and a third group of pixel electrodes allowing blue light to pass through, each said pixel area of the display panel comprising a first pixel electrode allowing red light to pass through, a second pixel electrode allowing green light to pass through, and a third pixel electrode allowing blue light to pass through, the first group of pixel electrodes consisting of multiple said first pixel electrodes, the second group of pixel electrodes consisting of multiple said second pixel electrodes, and the third group of pixel electrodes consisting of multiple said third pixel electrodes, each said pixel area being correspondingly connected with one said gate line and one said data line;

during one frame display, the data driver applying independent Gamma voltage to each said pixel electrode under the control of the timing controller; wherein the time controller divides time of the frame display into a first period, a second period, and a third period, and the time controller applies Gamma voltage to the first pixel electrodes of all of the pixel areas during the first period, applies Gamma voltage to the second pixel electrodes of all of the pixel areas during the second period, and applies Gamma voltage to the third pixel electrodes of all of the pixel areas during the third period; the gate driver driving gate lines connected with one of the first group of pixel electrodes, the second group of pixel electrodes, and the third group of pixel electrodes, and then driving gate lines connected with another of the first group of pixel electrodes, the second group of pixel electrodes, and the third group of pixel electrodes in sequence under the control of the timing controller;

wherein, the display panel further comprises a first TFT, a second TFT, and a third TFT located at each said pixel area, a drain of the first TFT is connected with the first pixel electrode, a drain of the second TFT is connected with the second pixel electrode, a drain of the third TFT is connected with the third pixel electrode, gates of the three TFTs are correspondingly connected with one said gate line, sources of the three TFTs are selectively and electrically connected with the data line; when a source of one of the three TFTs is electrically connected with the data line, sources of the other two of the three TFTs are electrically disconnected from the data line;

wherein, the display panel further comprises a first transistor provided between the first TFT and the data line, a second transistor provided between the second TFT and the data line, and a third transistor provided between the third TFT and the data line, the first transistor is turned on when a first enable signal is applied to each said pixel area, so that a source of the first TFT connected with the first pixel electrode is electrically connected to the data line, the second transistor is turned on when a second enable signal is applied to each said pixel area, so that a source of the second TFT connected with the second pixel electrode is electrically connected to the data line, the third transistor is turned on when a third enable signal is applied to each said pixel area, so that a source of the third TFT connected with the third pixel electrode is electrically connected to the data line.

11. The driving method as claimed in claim 10, wherein the timing controller controls the data driver to apply a Gamma voltage through an inter-integrated circuit (I2C) or a serial peripheral interface (SPI).

12. The display method according to claim 10, wherein, each pixel area includes Demux circuit, and the first, second, and third enable signals are Demux signals.

13. The display method according to claim 10, wherein, compared with an existing display panel in which after a data driver applies Gamma voltage to three pixel electrodes of a pixel area through a data line, the data driver applies Gamma voltage to three pixel electrodes of a next pixel area through a next data line, the driven time of each gate line is one-third of the existing display panel, and the driven frequency is three times the existing display panel.

14. The display method according to claim 10, further comprising a fourth group of pixel electrodes, wherein the fourth group of pixel electrodes are transparent pixel electrodes configured to enhance brightness.

* * * * *